United States Patent
Shekhar et al.

(10) Patent No.: US 11,416,444 B2
(45) Date of Patent: Aug. 16, 2022

(54) OBJECT-BASED STORAGE REPLICATION AND RECOVERY

(71) Applicant: NetApp, Inc., Sunnyvale, CA (US)

(72) Inventors: Sisir Shekhar, Bihar (IN); Michael R. Eisler, Colorado Springs, CO (US); Kartheek Muthyala, Hyderabad (IN); Ranjit Kumar, Santa Clara, CA (US)

(73) Assignee: NETAPP, INC., San Jose, CA (US)

( * ) Notice: Subject to any disclaimer, the term of this patent is extended or adjusted under 35 U.S.C. 154(b) by 239 days.

(21) Appl. No.: 15/081,520

(22) Filed: Mar. 25, 2016

(65) Prior Publication Data

US 2016/0210308 A1    Jul. 21, 2016

Related U.S. Application Data

(63) Continuation-in-part of application No. 14/217,941, filed on Mar. 18, 2014, now abandoned.

(51) Int. Cl.
*G06F 16/11* (2019.01)
*G06F 16/178* (2019.01)
(Continued)

(52) U.S. Cl.
CPC .......... *G06F 16/116* (2019.01); *G06F 16/174* (2019.01); *G06F 16/178* (2019.01); *G06F 16/1844* (2019.01); *G06F 2201/84* (2013.01)

(58) Field of Classification Search
CPC .......... G06F 17/30661; G06F 17/2288; G06F 17/30309; G06F 17/30076; G06F 16/178;
(Continued)

(56) References Cited

U.S. PATENT DOCUMENTS 6,512,961 B1 *  1/2003  Fukaya ............ G05B 19/40937
                                           700/174
7,373,364 B1    5/2008  Chapman
(Continued)

OTHER PUBLICATIONS

NETAPP., "Data ONTAP Edge", NetApp, Inc., Datasheet, retrieved on Dec. 17, 2015 from http://www.netapp.com/us/media/ds-data-ontap-edge.pdf, Jun. 18, 2015, 2 pages.
(Continued)

*Primary Examiner* — Mariela Reyes
*Assistant Examiner* — Fatima P Mina
(74) *Attorney, Agent, or Firm* — Haynes and Boone, LLP

(57) ABSTRACT

A method and system for replicating file system entities in a manner that preserves block-level access and file system efficiency mechanisms such as deduplication are disclosed. In an embodiment, a replication engine receives a stream of file system entities that include a file system inodes and file system data blocks. The replication engine generates object-based storage (OBS) objects based on data and reference information specified by the file system entities. As part of generating the OBS objects, the replication engine generates at least one inode file object that associates file block numbers of a file system inode file and the inode numbers. The replication engine uses inode information to generate reference objects that logically associate file block numbers with data block numbers in per inode manner. The replication engine further generates data objects that contains the file system data blocks and that associates the data blocks with corresponding data block numbers.

20 Claims, 6 Drawing Sheets

(51) Int. Cl.
*G06F 16/182* (2019.01)
*G06F 16/174* (2019.01)

(58) Field of Classification Search
CPC .. G06F 16/174; G06F 16/116; G06F 16/1844; G06F 3/0619; G06F 3/064; G06F 3/065; G06F 3/067; G06F 2201/84; G06F 11/1464
See application file for complete search history.

(56) References Cited

U.S. PATENT DOCUMENTS

| | | | |
|---|---|---|---|
| 7,676,514 B2 | 3/2010 | Faibish et al. | |
| 7,827,349 B1 | 11/2010 | Fair | |
| 7,870,356 B1 | 1/2011 | Veeraswamy et al. | |
| 8,200,638 B1 * | 6/2012 | Zheng | G06F 11/1469 707/679 |
| 8,234,250 B1 * | 7/2012 | Sharma | G06F 17/3015 707/649 |
| 8,655,848 B1 | 2/2014 | Leverett et al. | |
| 8,825,602 B1 * | 9/2014 | Desai | G06F 16/178 707/646 |
| 8,874,864 B2 | 10/2014 | Corbett et al. | |
| 9,223,612 B1 | 12/2015 | Feldman et al. | |
| 2003/0182313 A1 | 9/2003 | Federwisch et al. | |
| 2003/0182325 A1 | 9/2003 | Manley et al. | |
| 2005/0114289 A1 * | 5/2005 | Fair | G06F 12/0862 |
| 2005/0246382 A1 * | 11/2005 | Edwards | G06F 3/061 |
| 2006/0242164 A1 | 10/2006 | Evans et al. | |
| 2006/0242179 A1 | 10/2006 | Chen et al. | |
| 2007/0143340 A1 * | 6/2007 | Lee | G06F 12/0804 |
| 2007/0168633 A1 | 7/2007 | English et al. | |
| 2007/0214198 A1 | 9/2007 | Fontenot et al. | |
| 2008/0082589 A1 * | 4/2008 | English | G06F 16/119 |
| 2009/0055607 A1 | 2/2009 | Schack et al. | |
| 2009/0276593 A1 | 11/2009 | Jacobson et al. | |
| 2009/0276596 A1 | 11/2009 | Yadav et al. | |
| 2010/0088296 A1 * | 4/2010 | Periyagaram | G06F 16/1752 707/705 |
| 2010/0122053 A1 | 5/2010 | Prahlad et al. | |
| 2010/0191774 A1 | 7/2010 | Mason, Jr. et al. | |
| 2011/0016085 A1 * | 1/2011 | Kuo | G06F 16/184 707/615 |
| 2011/0016099 A1 | 1/2011 | Peer et al. | |
| 2011/0072224 A1 | 3/2011 | Popovski et al. | |
| 2011/0153567 A1 | 6/2011 | Sawdon et al. | |
| 2012/0136832 A1 * | 5/2012 | Sadhwani | G06F 11/1469 707/640 |
| 2013/0104251 A1 * | 4/2013 | Moore | G06F 21/602 726/30 |
| 2013/0111182 A1 | 5/2013 | Aslot et al. | |

OTHER PUBLICATIONS

NETAPP; Information Engineering., "Clustered Data ONTAP 8.2 Logical Storage Management Guide", NetApp, Inc., retrieved on Dec. 16, 2015 from https://library.netapp.com/ecm/ecm_download_file/ECMP1196906, Jul. 2013, 310 pages.

NETAPP., "NetApp Snapshot Technology", NetApp, Inc., NetApp Datasheet, retrieved on Dec. 16, 2015 from http://www.ant.hu/sites/default/files/u3/netapp_snapshot_ds-2477.pdf, Nov. 14, 2011, 2 pages.

NETAPP-, "NetApp Virtual Storage Tier", NetApp, Inc., Solution Brief, retrieved on Dec. 17, 2015 from http://www.netapp.com/ca/media/ds-3177-0412.pdf, Apr. 21, 2014, 4 pages.

International Search Report and Written Opinion for Application No. PCT/US2015/020607 dated Jun. 5, 2015, 12 pages.

Extended European Search Report for Application No. EP15766016 dated Oct. 2, 2017, 9 pages.

International Search Report and Written Opinion for Application No. PCT/US2017/023525 dated Jul. 5, 2017, 10 pages.

European Patent Office Action for Application No. EP17714383.1 dated Feb. 4, 2021, 5 pages.

* cited by examiner

OBJECT-BASED STORAGE REPLICATION AND RECOVERY

PRIORITY CLAIM

This application is a continuation-in-part of U.S. Patent Application Ser. No. 14/217,941, filed on Mar. 18, 2014, titled "BACKING UP DATA TO CLOUD DATA STORAGE WHILE MAINTAINING STORAGE EFFICIENCY," the content of which is incorporated by reference herein.

TECHNICAL FIELD

The disclosure generally relates to the field of storage systems, and more particularly to logical replication of file system storage to object-based storage.

BACKGROUND

Many cloud storage solutions utilize object-based storage (OBS) as the data layout paradigm. In contrast to file systems that utilize hierarchical directory namespaces, OBS typically employs a flat namespace allocated within a given logical container (sometimes referred to as bucket). In a cloud environment, an account may be associated with a logical container that contains variable sized data constructs (i.e., objects) that contain data and metadata based on a configuration of the logical container.

OBS is a scalable system for storing and managing data objects without using hierarchical naming schemas, thus avoiding the need to resolve pointers in traversing the organization levels to retrieve user data. OBS systems integrate, or "ingest," variable size data items as objects having unique ID keys into a flat name space structure. Object metadata may be stored with the objects themselves rather than in a separate metadata structure. Objects can be accessed and retrieved using key-based searching implemented via a web services interface such as one based on the Representational State Transfer (REST) architecture or Simple Object Access Protocol (SOAP). This allows applications to directly access objects across a network using "GET" and "PUT" commands without having to process more complex file system and/or block access commands.

Preservation of storage efficiency mechanisms such as deduplication when replicating file system data to OBS presents several challenges due to fundamental differences in data layout structure and naming schemas.

SUMMARY

Techniques for managing file system entities in an OBS are disclosed. In some embodiments, a replication engine receives a stream of file system entities that include inodes contained within an inode file and having respective assigned file index numbers utilized to index file system entities. The replication stream further includes data blocks. In an embodiment, the replication engine maps the file system entities to OBS objects including using the inode data to generate at least one inode file object that logically associates FBNs of the inode file with the file index numbers. As part of the mapping, the replication engine further uses the inode data to generate at least one indirection object that logically associates FBNs of indexed file system entities with respective ones of data block numbers corresponding to the received data blocks. The mapping further includes the replication engine generating at least one data object that contains the data blocks and that logically associates the data block numbers with the data blocks.

This summary is a brief summary for the disclosure, and not a comprehensive summary. The purpose of this brief summary is to provide a compact explanation as a preview to the disclosure. This brief summary does not capture the entire disclosure or all embodiments, and should not be used limit claim scope.

BRIEF DESCRIPTION OF THE DRAWINGS

Embodiments of the disclosure may be better understood by referencing the accompanying drawings.

DESCRIPTION

Figure 1A:
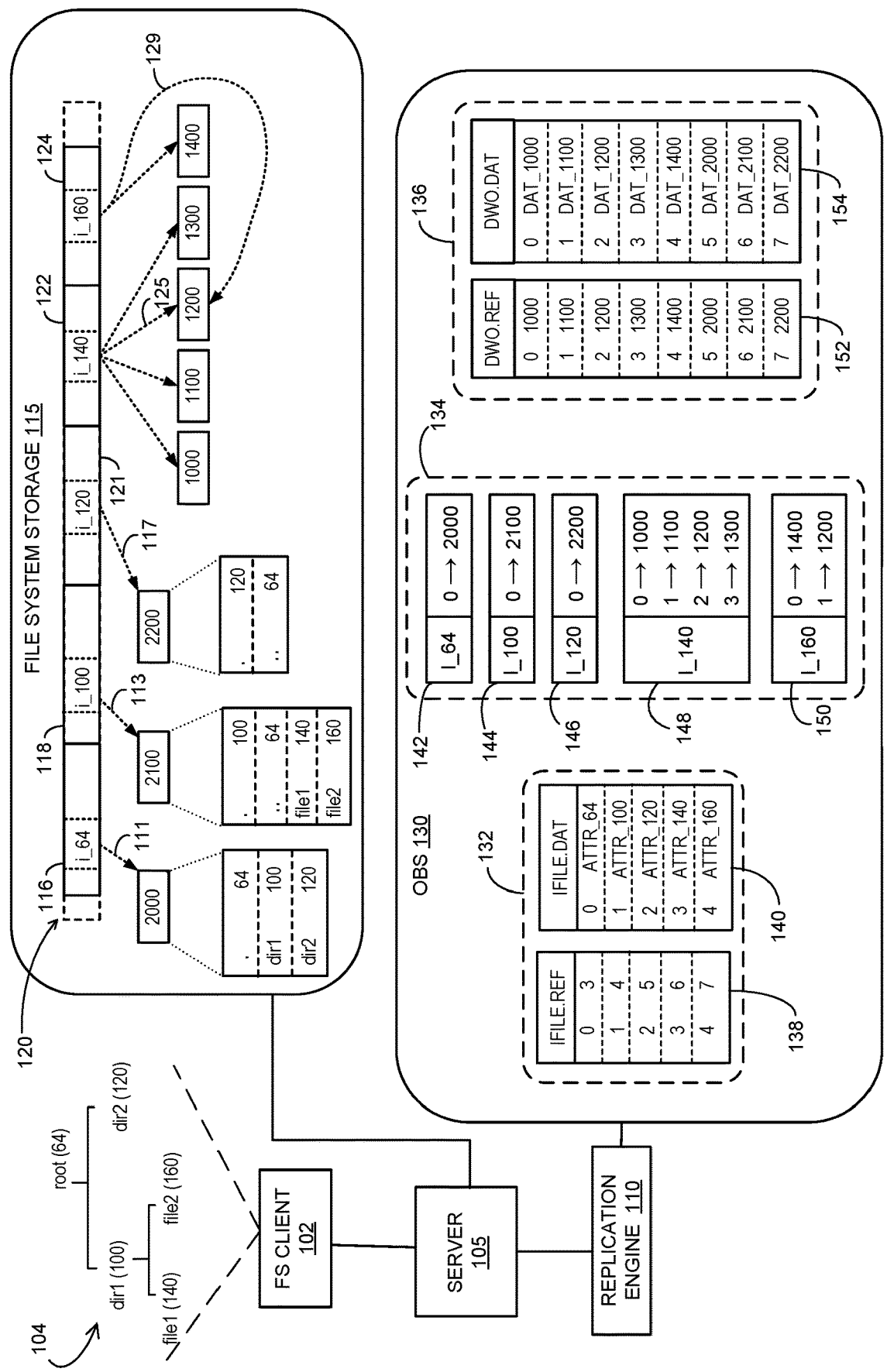
FIG. 1A is a block diagram depicting a storage replication system that preserves file system deduplication efficiency in accordance with an embodiment.

The description that follows includes example systems, methods, techniques, and program flows that depict embodiments of the disclosure. However, it is understood that this disclosure may be practiced without some of these specific details. In other instances, well-known instruction instances, protocols, structures and techniques have not been shown in detail in order not to obfuscate the description.

A file system includes the data structures and methods/functions used to organize file system entities (e.g., directories, files, inodes, etc.), access file system entities, and maintain a namespace of the file system. When stored as objects in object-based storage (OBS), file system entities are referred to as objects. Thus, an "inode object" is an object that corresponds to an inode file system entity, an "inode file object" is an object that corresponds to an inode file, etc.

In a hierarchical file system, as described herein, the file system structure is represented by a hierarchical set of data structures. The data structures generally include at least an inode file containing multiple inode data structures, or inodes. An inode file comprises a set of file blocks, each of which is assigned an index, referred to herein as an inode file file block number (FBN). Thus, a first file block in an inode file may be assigned an inode file FBN of "0", a second file block in the inode file might be assigned an inode file FBN of "1", etc.

Each file block within an inode file comprises a set of inodes, each of which is assigned an index, referred to herein as an inode number. As an inode file FBN is used to identify a file block within an inode file, an inode number is used to identify an inodes across the inode file. The FBNs used to identify file blocks and inodes may also indicate the sequential position of the respective data structure within the parent data structure, but this is not required.

An inode is a data structure that comprises metadata about a file system entity (e.g., a directory or file) and block pointers. The block pointers are assigned an index, referred to herein as a data FBN, which is used to identify the block pointer within the inode. A block pointer maps the data FBN identifying the block pointer to a data block number. The data block number is a logical block address (e.g., a volume block number) that maps to a physical block address (e.g., an aggregate block number and/or a disk block number). The physical block referenced by the physical block address can include another inode or actual file data.

As utilized herein, a "data block number" refers to a logical block address (e.g., volume block number) that may be mapped by a reference pointer to a physical block address (e.g., a data block, such as an aggregate block number and/or a disk block number) at which file data content is physically stored. In addition or alternatively, a "data block number" may refer to an aggregate block address (e.g., physical volume block number) or a physical storage media block number (e.g., block address of a hard disk, solid state drive, etc.).

Techniques are disclosed for replicating data that is stored in a hierarchical file system format to a backup storage that is configured to store data in an OBS format. In an embodiment, an object-based data layout is utilized to replicate data from a file system (e.g., Unix-based file system) to OBS (e.g., cloud-provisioned OBS). The object-based data layout enables the backup storage system to store the backup data in an object based format while preserving file system storage efficiency mechanisms such as deduplication and/or compression.

In an embodiment, the primary (source) data is initially replicated in a comprehensive baseline replication cycle in which file system data is mapped into multiple categories of OBS objects. Such categories may include inode file objects, indirection objects, and data objects. During mapping, file system data structures are selectively parsed for mapping into one or more of the multiple OBS object categories.

Subsequent to the baseline replication, a stream of file system entities to be replicated may comprise a point-in-time image (PTI) of the file system that records the state of the file system at a particular point. For example, a PTI may embody a file system "snapshot" such as implemented by some file systems that utilize inode-based pointer resolution to track files. Such snapshot-type PTIs record the state of the file system and therefore typically comprise a copy of the root inode of the file system in addition to block pointer information. In an embodiment, an OBS container may receive new objects mapped from a series of PTI replication streams that are periodically sent to the secondary OBS system. A PTI replication stream includes inodes and corresponding indexed file system entities (e.g., files and directories) that have been added or modified since a previous PTI replication. The file system entities may include deduplicated data blocks (i.e., data blocks referenced by two or more block pointers). The PTI replication stream may comprise diff streams that are packaged by a replication engine into sparse objects and stored in OBS using REST/HTTP application program interfaces (API's). The sparse objects may be represented as reference objects that may be used as indices to access corresponding data objects including data objects generated from deduplicated data blocks.

The replication engine may be implemented as a virtual machine (VM) that is configured to receive replication data streams from primary/source storage. The replication engine may include a parser configured to identify different data and metadata file system constructs from among the file system entities constituting a replication data stream. In one embodiment, the parser identifies inode data structures (inodes) within the replication data stream. Within the inodes, the parser may further identify attribute metadata and reference data in the form of pointers that associate data FBNs with data block numbers (DBNs). The parser may further identify data content in the form of data blocks within the replication stream. An object generator receives the parsed replication stream data and generates OBS objects therefrom, including attribute level objects, reference level objects, and data content objects.

FIG. 1 is a block diagram depicting a storage backup system that preserves file system deduplication efficiency in accordance with an embodiment. The depicted storage backup system includes a primary storage system comprising a storage server 105 having a file system storage 115. A file system client 102 is communicatively coupled to storage server 105 via a network connection. File system client 102 includes a memory into which a file system image 104 has been loaded. The file system image 104 includes data structures, referred to herein as file system entities, of a hierarchical file system such may be implemented by a Unix-type operating system such as Linux®. Specifically, the file system image 104 comprises a top-level/root directory, root, containing lower level directories dir1 and dirt. In the depicted embodiment, dirt contains no files and dir1 contains files file1 and file2. Shown within parentheses besides each of the file system entities are inode numbers that are assigned to respective inodes of the file system and correspond to the respective file system entities. The inode numbers may be used by the file system to identify the location of the inode data (e.g., by using a data structure that maps the inode number to an inode file FBN). In this manner, the inode numbers are essentially index numbers used in inode-based file systems to index file system entities in a manner enabling dereferencing of file system entity metadata and file system entity data content.

File system storage 115 contains the metadata, block pointer reference information, and data content that a storage server operating system (not depicted) uses to store and manage data. Namely, file system storage 115 includes an inode file 120 that includes inodes for recording the metadata and reference information for files and directories within the file system. File system storage 115 also includes corresponding data blocks having data block numbers 2000, 2100, 2200, 1000, 1100, 1200, 1300, and 1400. The metadata and reference information is recorded in multiple inodes, such as inodes i_64, i_100, i_120, i_140, and i_160 that are contained as data structures within file blocks 116, 118, 121, 122, and 124 of inode file 120. Each inode may consume a specified amount of storage space (e.g., 192 bytes) within storage blocks that may have fixed length (e.g., 4 KB). For example, assuming a block size of 4 KB with each inode consuming 192 bytes, a total of 21 inodes may be contained in each block. In such a configuration, the inode file block numbers (FBNs) for inodes i_64, i_100, i_120, i_140, and i_160 are 3, 4, 5, 6, and 7, respectively. Each inode contains metadata and references (e.g., block pointers) for the file system entity that it represents.

Each of file blocks 116, 118, 121, 122, and 124 is assigned an inode file FBN, as described above. In the depicted example, the file blocks 116, 118, 121, 122, and 124 are assigned inode file FBNs "3," "4," "5," "6," and "7," respectively. The depicted numeric references in each of the inode names designates the inode's file index number (inode number). For example, the inode number of i_64 is 64, the inode number for i_120 is 120, and similarly for the remaining inodes. As known in typical inode-based file systems, the inode numbers are unique file index numbers utilized to uniquely index the underlying files and directories within a file system.

While implementations of inode-based file systems may often utilize multiple reference levels (e.g., using double indirect pointers) for large files, only a single level is depicted in FIG. 1 for ease of illustration. Furthermore, while many inode-based file systems may implement storage virtualization in which a virtual volume blocks are mapped to physical volume blocks (e.g., within an aggregate), such virtual-to-physical volume mappings are not essential to the principles described herein and are therefore not depicted.

The metadata contained within inodes may include file/directory attributes such as type (file or directory), size, creation time, modification time, and access control information, etc. As part of or in addition to the metadata, inodes for directories and files include reference information in the form of block pointers to data blocks that contain the respective directory/file data content. The enumerated block pointers, such as block pointer 111, are contained within designated sections of each of the inodes and comprise mappings from data FBNs of the indexed file system entity to DBNs. For instance, inode i_64 includes a pointer 111 from data FBN 0 of the root directory to DBN 2000. Similarly, inodes i_100 and i_120 include pointers 113 and 117 from their respective data FBN 0 to DBNs 2100 and 2200, respectively.

The content of directory data blocks comprises mappings from a parent directory to the directory inode number and also mappings from names of any children file system entities (directories and files) to their respective inode numbers. For instance, the content of the root directory, contained within DBN 2000, is depicted as including mappings from the root directory name "." to inode number 64, from dir1 to inode number 100, and from dirt to inode number 120. Similarly, the content of dirt, contained within DBN 2100, is depicted as including its own name-to-inode number mapping as well as mappings from its parent directory name to inode number 64, from file1 to inode number 140, and from file2 to inode number 160. The content of the file data blocks, such as the data blocks assigned DBNs 1000, 1100, 1200, 1300, and 1400, contain the file data content. As shown in FIG. 1, file inodes i_140 and i_160 each include pointers to multiple DBNs, with inode i_140 pointing to DBNs 1000, 1100, 1200, and 1300, and inode i_160 pointing to DBNs 1400 and 1200. In this manner, file1 (via inode i_140) and file2 (via inode i_160) share DBN 1200 by including respective pointers 125 and 129 that point to the same DBN 1200 such as may occur in a case of deduplication if the data content of DBN 1200 was determined be identical to the data content of another data block.

The depicted primary storage system further comprises a replication engine 110 for processing file system entities received from file system storage 115 such as during data backup to a secondary storage system depicted in FIG. 1 as OBS 130. The processing of replication engine 110 provides file system to OBS mapping in a manner that preserves storage efficiency that may be attained via techniques such as deduplication and/or compression. Replication engine 110 includes a parser (not depicted) that processes replication streams received from storage server 105 to identify various categories of file system constructs to be used in generating corresponding OBS objects. In an embodiment, replication engine 110 identifies one or more of inodes i_64, i_100, i_120, i_140, and i_160 that may be included in a replication stream. In response to detecting the inodes, such as may occur during a baseline file system replication, replication engine 110 generates one or more corresponding OBS objects. In the depicted embodiment, replication engine 110 generates a set of inode file objects 132 that contain the file/directory attribute metadata information contained by the corresponding inodes. Inode file objects 132 further record the inode file FBNs of the file blocks of inode file 120, and logically associate the inode file FBNs with corresponding inode numbers.

The inode file objects 132 include an inode reference object 138 and an inode data object 140. As shown in FIG. 1, inode reference object 138 includes an object ID, IFILE.REF, that may be used as an access key to the object within OBS 130, (node reference object 138 further includes data content in the form of multiple consecutive indexed entries 3, 4, 5, 6, and 7, respectively corresponding to the inode file FBNs of the file blocks 116, 118, 121, 122, and 124 that respectively contain inodes i_64, i_100, i_120, i_140, and i_160. Entries 3, 4, 5, 6, and 7 are indexed using a numeric sequence 0, 1, 2, 3, and 4. Inode data object 140 includes an object ID, IFILE.DAT, that may be used as an access key to the object within OBS 130. Inode data object 140 further includes data content in the form of multiple consecutive indexed entries represented in FIG. 1 as ATTR_64, ATTR_100, ATTR_120, ATTR_140, and ATTR_160. While not expressly shown in the depicted embodiment, each of the IFILE.DAT entries contains the inode number and attribute metadata of the respective underlying file system entity (e.g., file or directory) represented by inodes i_64, i_100, i_120, i_140, or i_160. Similar to the IFILE.REF entries, entries ATTR_64, ATTR_100, ATTR_120, ATTR_140, and ATTR_160 are indexed using a numeric sequence 0, 1, 2, 3, and 4. The correspondence of the indexing of inode reference object 138 and inode data object 140 provides logical associations between the inode file FBNs within IFILE.REF and the inode numbers and metadata within IFILE.DAT.

In addition to detecting and mapping the inode metadata into OBS objects, replication engine 110 may detect or otherwise identify the block pointer references contained in each of the inodes. For instance, replication engine 110 may identify pointers from an FBN of the root directory (represented by inode i_64) to DBN 2000. Similarly, replication engine 110 identifies the pointers from the FBNs of dir1 and dirt (represented by inodes i_100 and i_120) to DBNs 2100 and 2200, respectively. Replication engine 110 also identifies the reference pointers from FBNs of file file1 to DBNs 1000, 1100, 1200, and 1300, and from the FBNs of file1 to DBNs 1400 and 1200.

Having identified the reference pointers within the inodes received in the replication stream, replication engine 110 generates a set of one or more indirection objects 134 that each logically associate FBNs of the file system entities represented by the inodes with respective ones of DBNs that correspond to the data blocks received in the replication stream. Specifically, the set of indirection objects 134 comprises indirection objects 142, 144, 146, 148, and 150 that respectively include object IDs i_64, i_100, i_120, i_140, and i_160, which correspond to the inode numbers of the inodes and are used as access keys to the object within OBS 130. In addition to having an object ID corresponding to an inode number, each of the indirection objects includes one or more data entries that each logically associates a FBN of an indexed file system entity with a corresponding DBN. For example, indirection object 144 includes an object ID I_100 corresponding to inode number 100 and further including a single data entry embodied as a pointer from FBN 0 of dir1 to DBN 2100. Indirection object 148 includes an object ID i_140 corresponding to inode number 140 and further includes data entries (pointers) that logically associate data FBNs 0, 1, 2, and 3 of file1 with DBNs 1000, 1100, 1200, and 1300, respectively.

During baseline replication, replication engine 110 further detects the data content of file system entities such as the content of dir1, dir1, file1, and file2 and generates a set of one or more corresponding data objects 136. Data objects 136 contain the data blocks received in the replication stream and also record and logically associate data block numbers with the data blocks. In the depicted embodiment, the data objects 136 include a data reference object 152 and a data content object 154. Data reference object 152 includes an object ID, DWO.REF, that may be used as an access key to the object within OBS 130. Data reference object 152 further includes data content in the form of multiple consecutive indexed entries 1000, 1100, 1200, 1300, 1400, 2000, 2100, and 2200, which respectively correspond to the DBNs of the data blocks received in the replication stream. As shown, the entries are individually indexed using a numeric sequence 0-7. Data content object 154 includes an object ID, DWO.DAT, that may be used as an access key to the object within OBS 130. Data content object 154 further includes data content in the form of multiple consecutive indexed entries represented in FIG. 1 as DAT_1000, DAT_1100, DAT_1200, DAT_1300, DAT_1400, DAT_2000, DAT_2100, and DAT_2200. While not expressly depicted, the DWO.DAT entries each contain the file content data of a data block contained within the respective underlying file system entity. Similar to the DWO.REF entries, the DWO.DAT entries are indexed using the numeric sequence 0-7. The correspondence of the indexing of data reference object 152 and data content object 154 provides logical associations between the file system entities' DBNs and the respective data blocks.

In the foregoing manner replication engine 110 effectuates logical replication of the file system structures within file system storage 115 into an OBS format within OBS 130. Storage efficiency mechanisms such as deduplication are preserved, in part by preserving the primary (sources) FBN-to-DBN mappings in the indirection objects 134.

Figure 1B:
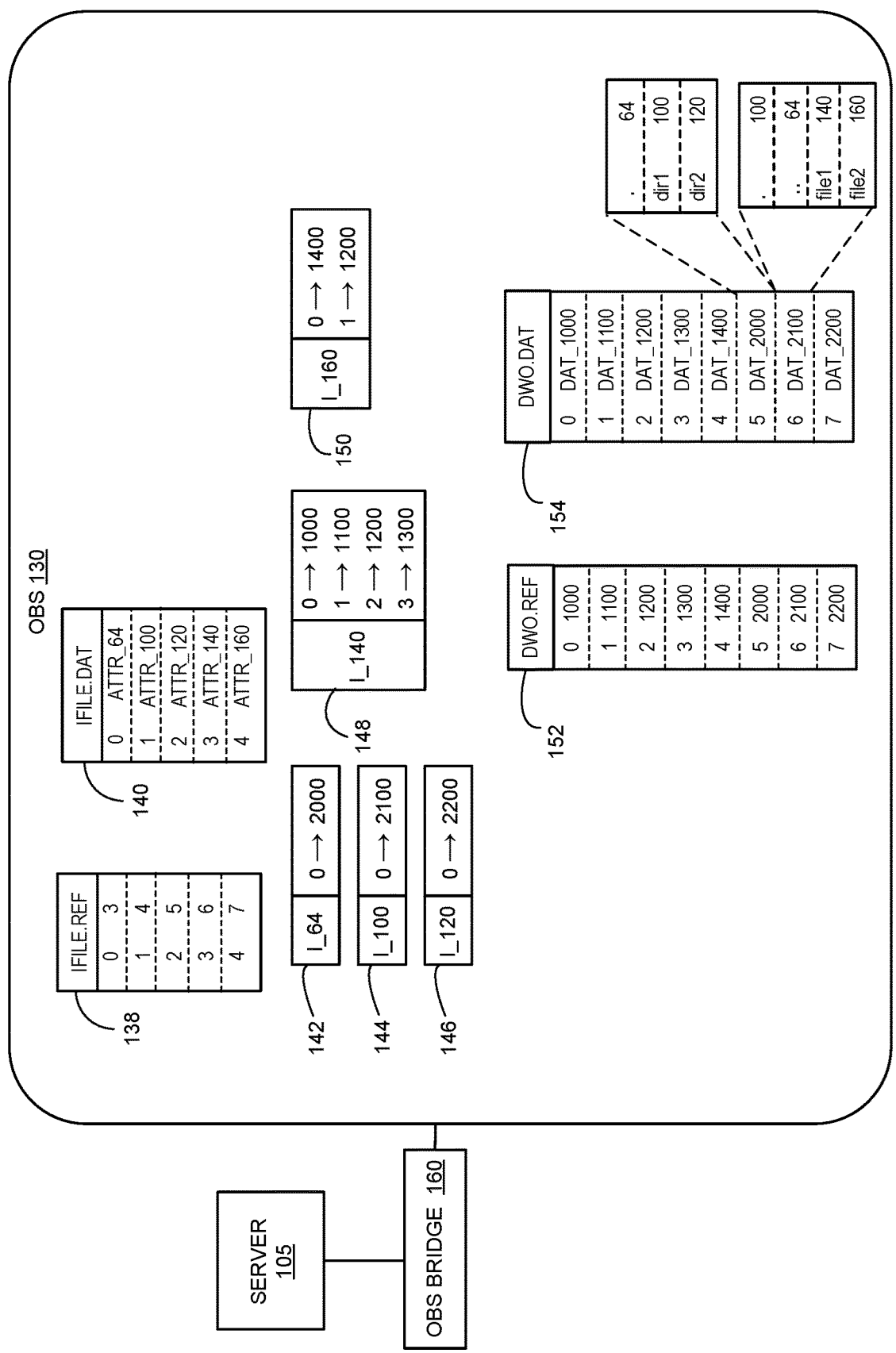
FIG. 1B is a block diagram illustrating portions of the storage replication system depicted in FIG. 1A that may be utilized to enable read-only access to OBS objects in accordance with an embodiment.

FIG. 1B is a block diagram illustrating portions of the storage replication system depicted in FIG. 1A that may be utilized to enable read-only access to OBS objects within OBS 130 in accordance with an embodiment. As shown in FIG. 1A, the storage server 105 is configured to communicate with an OBS bridge 160 that may be incorporated within replication engine 110 or as a logically distinct entity with separate logical and physical connectivity. OBS bridge 160 is configured, using any combination of coded software, firmware, and/or hardware, to translate, such as by code mapping or otherwise, file system read commands into equivalent OBS commands (e.g., GET command). Given that the depicted OBS 130 comprises the OBS data layout described with reference to FIG. 1A, the mapping performed by OBS bridge 160 includes parsing operands (e.g., file pathname) as well as operations (e.g., READ). As part of its mapping function, OBS bridge 160 may generate a pathname-dependent series of OBS commands that traverses the inode file objects, indirection objects, and data objects in a manner enabling effective block-level access from a source side client.

For example, server 105 may issue a READ command to OBS bridge 160 requesting that FBNs 2 and 3 of file1 be read from OBS 130. Parsing the request, OBS bridge 160 identifies file1 as the target and, in response, uses the IFILE.REF key to access inode file reference object 138 and locate the inode file FBN 3 containing the inode 64 that represents the root directory. Determining the index position, 0, of the FBN 3 entry, OBS bridge 160 uses the IFILE.DAT key to access inode file data object 140. Using the determined index position of FBN 3 (index 0), OBS bridge 160 locates and reads the corresponding inode metadata entry, ATTR_64, within data object 140. OBS bridge 160 determines the inode number "64," from the metadata and applies the key name i_64, to identify and access indirection object 142. OBS bridge 160 reads the block pointer information that identifies DBN 2000 as containing the directory content. Next, OBS bridge 160 uses the DWO.REF key to access data reference object 152 and determine the indexed position of DBN 2000 therein. Having determined that DBN 2000 is indexed at position "5" within DWO.REF, OBS bridge uses the DWO.DAT key to access data content object 154 and applies the indexed position "5" of DBN 2000 to locate DAT_2000, which in FIG. 1B represents the data content of the root directory. As depicted, DAT_2000 comprises an entry associating the root directory name with inode number 64 and entries associating dir1 and dirt with inode numbers 100 and 120, respectively. OBS bridge 160 uses pathname information to select the dir1 entry and identify the corresponding inode number, 100.

Having traversed all three OBS levels to resolve the inode number 100 of the directory dir1 containing file1, OBS bridge 160 returns to inode file reference object 138 to identify the inode file FBN 4 in which inode 100 is contained. The determination of the inode file FBN may be based on a pre-specified mapping between inode numbers and inode file FBNs such as based on the aforementioned allocation of 21 inodes per file block within the inode file. OBS bridge 160 uses the indexed position, "1," of inode file FBN 4 to locate and read the corresponding inode metadata content entry, ATTR_100, within inode file data object 140. The inode number 100 is then used by OBS bridge 160 as an object key to access and read the block pointer content of indirection object 144. The block pointer 2100 is identified and used by OBS bridge 160 to locate the indexed position "6" within data reference object 152, which OBS bridge 160 uses to locate and read the dir1 data content, DAT_2100, within data content object 154. As shown, the data content includes entries that associate the directory and parent directories with inode numbers 64 and 100 and also entries that associate filenames file1 and file2 with inode numbers 140 and 160, respectively. OBS bridge 160 uses pathname information to select the file1 entry and identify 140 as the inode number to search for.

OBS bridge 160 then uses inode number 140 to determine the corresponding inode file FBN 6, which is then located within inode file reference object 138 to determine an index position "3" that is used to locate the metadata entry, ATTR_140, within inode file data object 140. OBS bridge 160 then reads the content of indirection object 148 and uses the original READ command information specifying FBNs 1 and 2 to identify corresponding DBN entries DAT_1100 and DAT_1200 within data content object 154 based on the block pointers.

Figure 2:
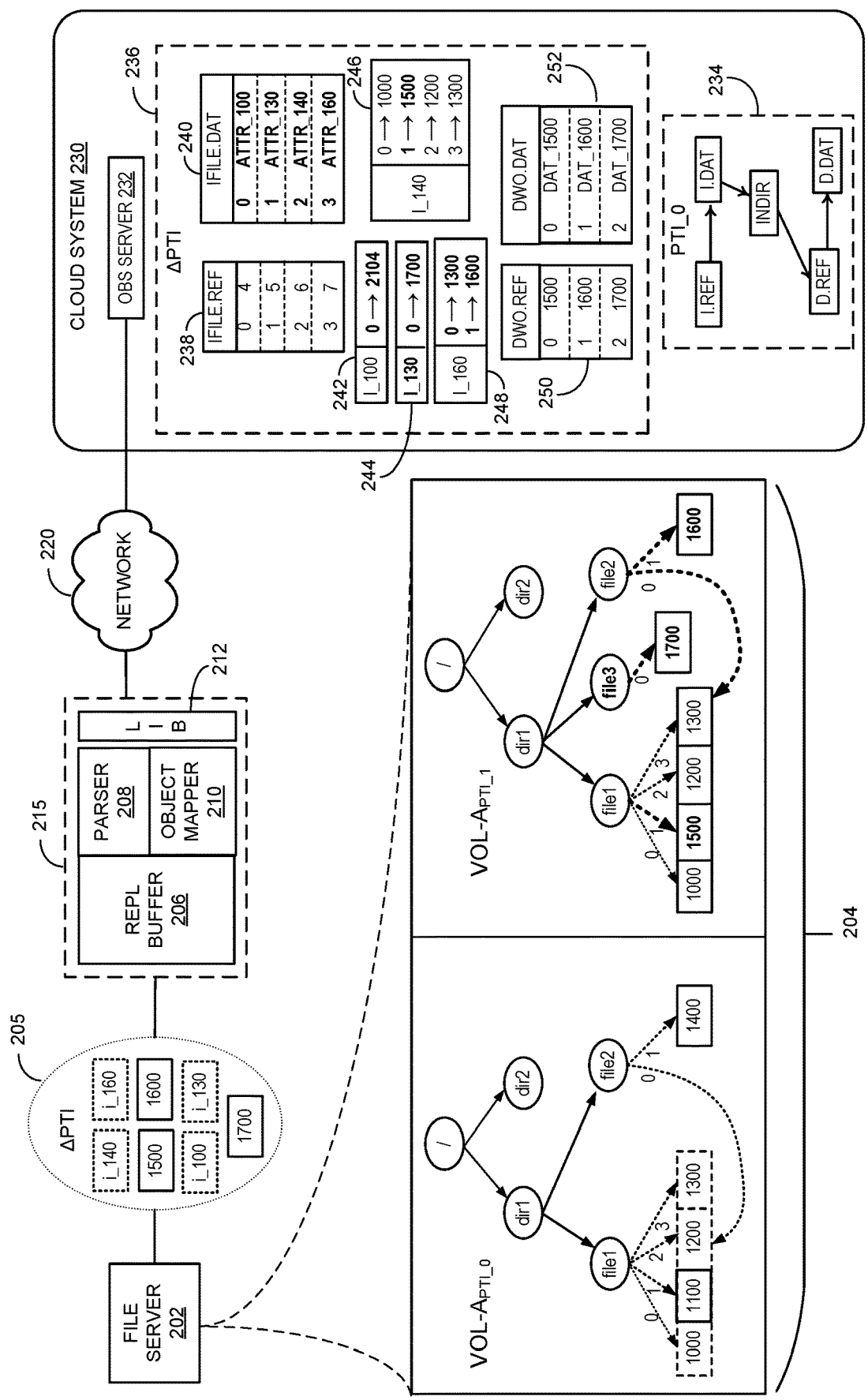
FIG. 2 is a block diagram illustrating subsystems and components for processing replication streams including point-in-time image (PTI) replication streams in accordance with an embodiment.

FIG. 2 is a block diagram illustrating subsystems and components for processing replication streams including point-in-time image (PTI) replication streams in accordance with an embodiment. The system shown in FIG. 2 includes a file server 202 that provides shared network access to a file system storage volume 204. Storage volume 204 may include some or all of the inode-based structural aspects depicted and described with reference to FIG. 1, and includes a baseline PTI, VOL-An 1, which represents the active file system volume. Storage volume 204 further includes inode and block pointer structures that form a previous PTI (e.g., snapshot), VOL-$A_{PTI\_0}$. As utilized herein, a PTI, is essentially a point-in-time copy of a file system and/or a point-in-time copy of the state of the file system. PTIs may be generated periodically and/or based on system events or conditions to provide a level of data protection and recovery capacity.

The VOL-$A_{PTI\_0}$ includes inodes and the file system entities indexed and otherwise represented by the inodes depicted in FIG. 2 as a hierarchical pointer tree beginning with the root directory "/". Similar to the structure of file system storage 115 in FIG. 1, the file system tree structure embodied by the VOL-$A_{PTI\_0}$ includes a pair of directories, dir1 and dirt, contained within the root directory, and further includes a pair of files, file1 and file2, contained within dir1. Only the data blocks for file-type file system entities are expressly depicted in FIG. 2. As shown, the VOL-$A_{PTI\_0}$ for file1 includes pointers from FBNs 0, 1, 2, and 3 to DBNs 1000, 1100, 1200, and 1300, respectively. The VOL-$A_{PTI\_0}$ PTI for file1 includes pointers from FBNs 0 and 1 to DBNs 1200 and 1400, respectively.

The file system storage volume 204 has been modified in several ways from the point in time at which the VOL-$A_{PTI\_0}$ was generated to the current baseline image VOL-$A_{PTI\_1}$. The changes include a modification to FBN 1 of file1 (e.g., resulting from a WRITE operation) that results in the corresponding inode block pointer being modified to point to the new data at the new DBN 1500. No other change being made to file1 from the VOL-$A_{PTI\_0}$ PTI to the VOL-$A_{PTI\_1}$ PTI (i.e., active image), the unmodified data blocks having DBNs 1000, 1200, and 1300 are depicted with dashed line in the VOL-$A_{PTI\_0}$ PTI to convey the absence of the actual ata content within the VOL-$A_{PTI\_0}$ PTI itself. The changes to the file system further include modification of FBN 0 of file2 so that the data content of file2 FBN 0 matches the data content of FBN 3 of file1 which points to DBN 1300 within the file1 inode. In response to detecting the data block modification, a block-level deduplication cycle has modified the block pointer for file2 FBN 0 to point to DBN 1300. FBN 1 of file2 has also been modified so that the file2 FBN1 inode pointer has been changed to point to where the modified data block resides at DBN 1600. The foregoing modifications to block pointers in the inodes that represent file1 and file2 result in corresponding modifications to the metadata for dir1. In addition to the modifications to file1 and file2, a new file system entity, file3, has been added to dir1 as shown in the representative file tree structure for the VOL-$A_{PTI\_1}$ PTI. The file3 entity is represented by a newly assigned inode (not depicted) that includes a block pointer from FBN 0 to DBN 1700.

As depicted and described with reference to FIG. 1, a storage server such as file server 202 may execute replication cycles in which the file system storage volume 204 is replicated as a backup image in OBS. The objects for the file-system-to-OBS replication are generated by a replication engine 215 using a data layout that preserves the storage management operations (e.g., storage snapshot and deduplication) that are available in the file system and with block level storage. The secondary (or backup) storage system is embodied within a cloud system 230 that is communicatively connected to file server 202 via a network 220. In the example illustration, a file system client may replicate data from file system storage volume 204 to object storage containers 234 and 236 within cloud system 230. Cloud system 230 includes numerous devices and program instances ("modules"), but only a few are depicted in FIG. 2 to avoid unduly complicating the figure.

The depicted cloud system 230 includes an OBS server 232 that provides access to and manages object containers 234 and 236. Object container 234 has an assigned container name, PTI_0, and corresponds to a PTI for VOL-A at the time the VOL-$A_{PTI\_0}$ PTI was the active file system image (i.e., at the point at which the VOL-$A_{PTI\_0}$ PTI was recorded). The container name may be included in HTTP URLs to locate and access objects within the container. Object container 234 further includes multiple objects that were generated in the same or similar manner as that described in FIG. 1 for the baseline replication of file system data to OBS objects. FIG. 2 depicts the objects within container 234 in a simplified, single box form for purposes of illustrative simplicity. Namely, object container 234 includes an I.REF object and an I.DAT object that respectively correspond in structure and detail to inode reference object 138 and inode data object 140 depicted in FIG. 1. The illustrated pointer from I.REF to I.DAT represents the index correspondence between the inode file FBN entries in I.REF and the inode number and metadata attribute entries in I.DAT. Object container 234 further includes indirection objects that are represented in FIG. 2 as a single box, INDIR. The indirection objects are generated, such as during a baseline replication cycle in the same or similar manner as depicted and described for the generation of indirection objects 134 in FIG. 1. The depicted pointer from the I.DAT object to the INDIR objects represents the logical association between the I.DAT object inode number data and the object IDs of the INDIR objects that are the same as or otherwise directly correspond to the inode numbers. Object container 234 further includes a D.REF object and a D.DAT object that respectively correspond in structure and detail to data reference object 152 and data content object 154 depicted in FIG. 1. The depicted pointer from the INDIR objects to D.REF represents the logical association between the DBNs included in the block pointer entries of the indirection objects and the DBNs listed as sequential, indexed data entries within D.REF. The illustrated pointer from D.REF to D.DAT represents the index correspondence between the DBN entries in D.REF and the data block entries in D.DAT.

At a specified replication period or in response to an event-based trigger, such as a client request for replication, file server 202 initiates an incremental replication of the data within VOL-A that has been modified from the point at which object container 234 was generated and recorded to include the aforementioned modifications reflected in the VOL-$A_{PTI\_1}$ PTI. In an embodiment, file server 202 transmits a replication request including or followed by a replication stream that comprises a stream of file system entities 205. As depicted, the replication stream of file system entities 205 includes inodes as well as indexed file systems entities such as files and directories. Specifically, file system entities 205 include the modified data blocks for file1 and file2 that have been written to new locations having DBNs 1500 and 1600. The replication stream also includes the new data block at DBN 1700 that contains the data content of new file3. File system entities 205 further includes file inodes i_140 and i_160. Referring to FIG. 1 in conjunction with FIG. 2, inode i_140 (representing file1) and inode i_160 (representing file2) are included in the replication stream due to updates in the respective inode block pointers. Directory inode i_100 is included in the replication stream due to changes to dill metadata and directory inode i_130 that represents new file3 is also included.

File server 202 communicates with a replication engine 215 to perform full (baseline) or incremental (difference between PTIs) replications of the file system into OBS objects stored within cloud system 230 via OBS server 232. In the depicted embodiment, replication engine 215 comprises a replication buffer 206, a parser 208, an object mapper 210, and a protocol interface library 212. Replication buffer 206 initially receives and processes the replication stream generated by file server 202. Specifically, replication buffer 206 may be configured to sequentially order the received data blocks, inodes, and possibly other file system entities for optimal processing by parser 208 and object mapper 210. Parser 208 is configured, using any combination of coded software, firmware, and/or hardware, to selectively identify and interpret each of the file system entities 205 in a given replication stream and to provide the resultant identified entity and sub-entity information to object mapper 210. For example, parser 208 may be configured to identify data blocks 1500, 1600, and 1700 as data blocks and to read the respective DBNs. Parser 208 may also be configured to read and associate the respective data block content with each of the DBNs. For received inodes, parser 208 may be configured to identify inodes i_140, i_160, i_100, and i_130 and read the respective metadata content as well as the block pointers. Object mapper 210 is configured, using any combination of coded software, firmware, and/or hardware, to map the parsed portions of the file system entities into object such as within object container 236 for the incremental replication of the difference between the VOL-Ap$_{ra}$o PTI and the VOL-A$_{PTI\_1}$ PTI.

Object container 236 is depicted in FIG. 2 as including the objects generated by replication engine 215 from replication stream entities 205. Included among the incremental replication objects are inode reference object 238 and inode data object 240. Inode reference object 238 includes an object ID, IFILE.REF, and a set of indexed entries each comprising an inode file FBN within which the respective inode is contained. For instance, the third entry (indexed as "2") in inode reference object 238 comprises FBN "6", which is the inode file FBN in which the corresponding inode i_140 is contained. Inode data object 240 includes an object ID, IFILE.DAT, and a set of indexed entries each comprising the metadata for a respective one of the file system entities represented by the inode. For example, the second entry (indexed as "1) in inode data object 240 comprises the attribute metadata (i.e., metadata except for block pointers) for file3 that was added in the VOL-A$_{PTI\_1}$ PTI is represented by new inode i_130.

Object container 236 further includes indirection object 242 that was mapped/generated by replication engine 215 using parsed information from directory inode 100. As depicted, the content of indirection object 242 comprises a pointer from FBN 0 of dir1 to the new location (DBN 2104) of the data block corresponding to dir1 FBNO. Indirection objects 244, 246, and 248 are mapped/generated by replication engine 215 using parsed information from file inodes 130, 140, and 160, respectively. Indirection object 244 is itself an addition to the set of indirection objects included in object container 234 for PTI_0 due to the addition of a new file, file3. Indirection objects 246 and 248 include highlighted modifications from the corresponding indirection objects within container 234. Namely, indirection object 246 includes a new block pointer from FBN 1 to DBN 1500, and for indirection object 248 the previous pointers from FBNs 0 and 1 to DBNs 1200 and 1400 have been replaced by pointers to DBNs 1300 and 1600.

To address the changes to data blocks, reflected in DBNs 1500, 1600, and 1700, object container 236 further includes a data reference object 250 and a data content object 252. As shown, the indexing between the entries of data reference object 250 and data content object 252 is mutually consistent and based on the data blocks received in the replication stream.

Figure 3:
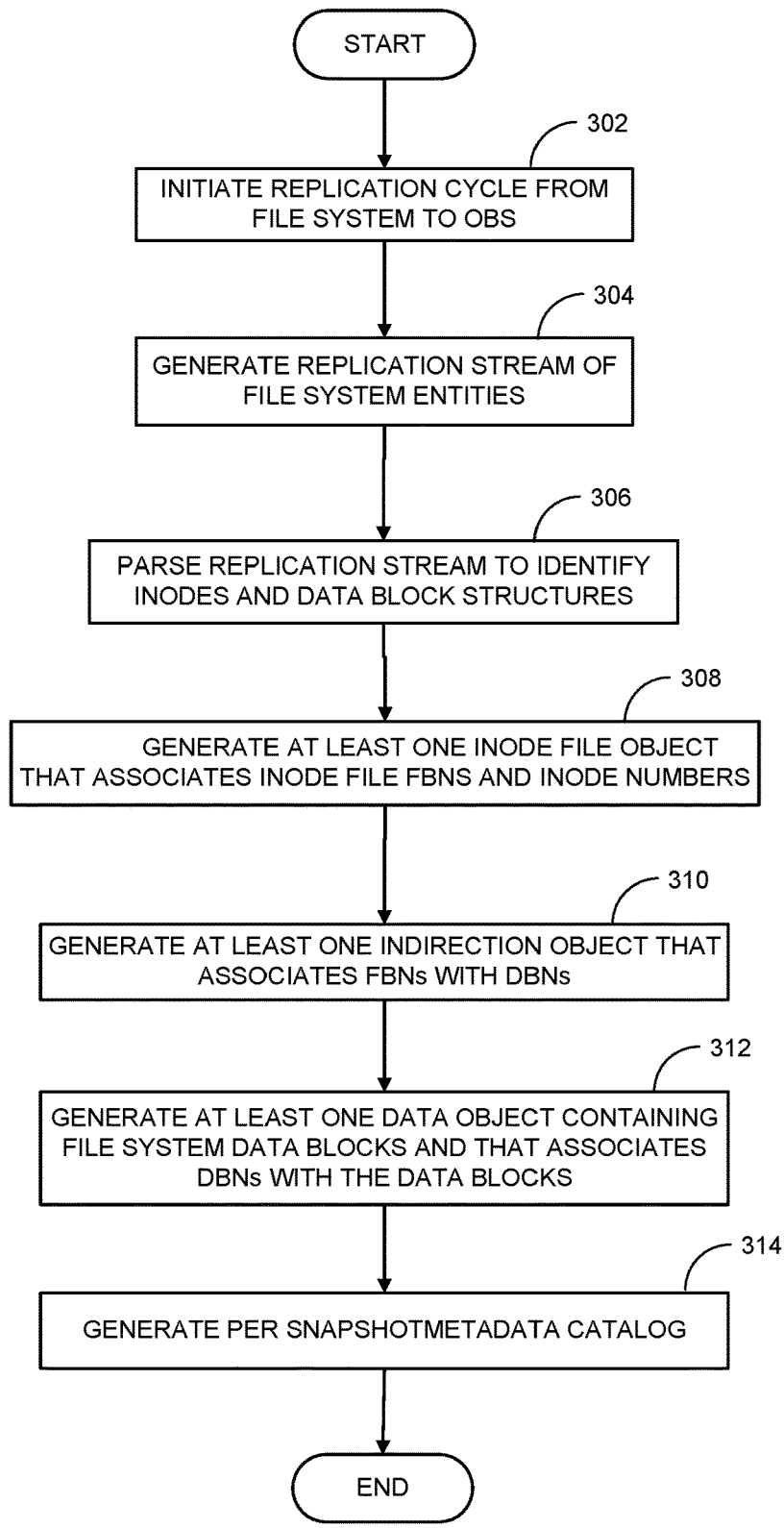
FIG. 3 is a flow diagram depicting operations and functions performed during replication of file system entities in accordance with an embodiment.

FIG. 3 is a flow diagram illustrating operations and functions performed during storage replication in accordance with an embodiment. The process begins as shown at block 302 with a replication engine receiving a signal indicating initiation of a replication cycle from a primary file system source storage to an OBS secondary system. Next, at block 304 the replication engine generates a stream of data items from a file system to be replicated to OBS. For example, the data stream may include the data structures and other file system entities included within a point-in-time image (PTI) (sometimes referred to as a snapshot) of the file system. In an embodiment, the file system entities include one or more data blocks that have been deduplicated and one or more inodes that specify the corresponding deduplicated data block pointers. The process continues as shown at block 306 with a parser parsing the data stream of replication data to identify inode metadata, inode reference pointers, and data blocks.

At block 308 the replication engine generates one or more inode file objects that individually or collectively associate FBNs of the inode file with inode numbers of the inodes received in the replication stream. Next, the replication engine generates one or more indirection objects that each logically associate FBNs of indexed file system entities (files or directories) with respective DBNs of the data blocks received in the replication stream (block 310). In an embodiment, each of the indirection objects is assigned an object access key name that corresponds to a single inode number. The replication engine generates a third object category in addition to the inode file objects and indirection objects. Namely, the replication engine generates one or more data objects that contain the data blocks received in the replication stream and that also logically associate the data block numbers with the data blocks (block 312).

During or following the object generation at blocks 308, 310, and 312, the replication engine also generates a per-snapshot metadata catalog at block 314. For example, the parser may further process the replication data stream to identify and designate file system entities as "inode number," "parent inode number," "file type," "PTI," "absolute path," and "operation." In response, an object mapper such as that depicted in FIG. 2 may generate a metadata catalog having per-snapshot entries, and wherein each of the per-snapshot entries includes fields for "inode number," "parent inode number," "file type," "PTI," "absolute path," and "operation." The generated metadata catalog can be utilized during data recovery from the secondary system. For example, the information in the catalog may enable more efficient querying of a file system directory and its content for a particular snapshot. The catalog further enables querying of a filename across different pathnames and different snapshots.

Figure 4:
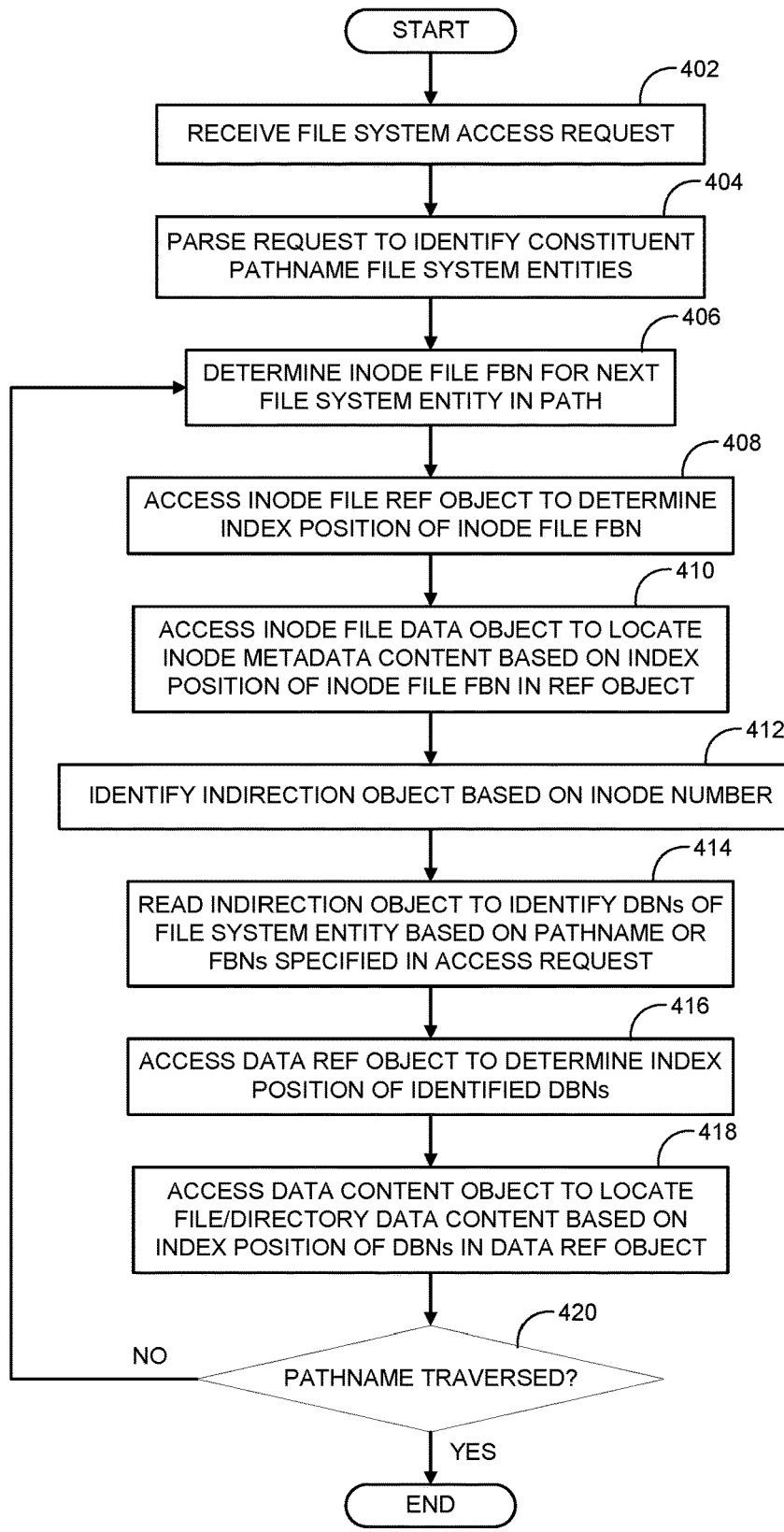
FIG. 4 is a flow diagram illustrating operations and functions performed for translating between file system block-level access and OBS object access in accordance with an embodiment.

FIG. 4 is a flow diagram illustrating operations and functions performed for translating between file system block-level access and OBS object access in accordance with an embodiment. The process begins at block 402 with an OBS bridge receiving a file system access request such as may be transmitted from a file server hosting a file system storage that is replicated to OBS as described with reference to FIGS. 1-3. In an embodiment, the OBS bridge is configured to map file system read requests to corresponding OBS requests that enable effective access to block-level data. At block 404, the OBS bridge parses the request to identify the file system entities, beginning with the file system root directory included in the request pathname. Having parsed the pathname, the OBS bridge begins with the root directory entity and determines a corresponding inode file FBN (block 406) that will be used to locate attribute metadata in the inode file objects. At block 408, the OBS bridge accesses an inode file reference object to determine the index position of the inode file FBN. Next at block 410, the OBS bridge accesses an inode file data object and uses the determined index position to locate the metadata content entry for the corresponding file system entity.

Having read the metadata content, the OBS bridge identifies one of the indirection objects based on the object ID (key) of the identified indirection object matching the inode number of the file system entity (block 412). At block 414, the OBS bridge uses the pathname and/or FBNs specified therein to selectively read the identified indirection object to identify DBNs containing the data content of the file system entity. Next, the OBS bridge accesses a data reference object and uses the identified DBNs to determine their respective indexed positions within the indexed list of entries (block 416). The OBS bridge then uses the indexed position information to locate the file or directory content entries within a data content object (block 418). The process then iterates through the pathname until the requested data (e.g., one or more file blocks of a file) is retrieved as shown by the cycle from block 420 and control passing back to block 406.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality provided as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
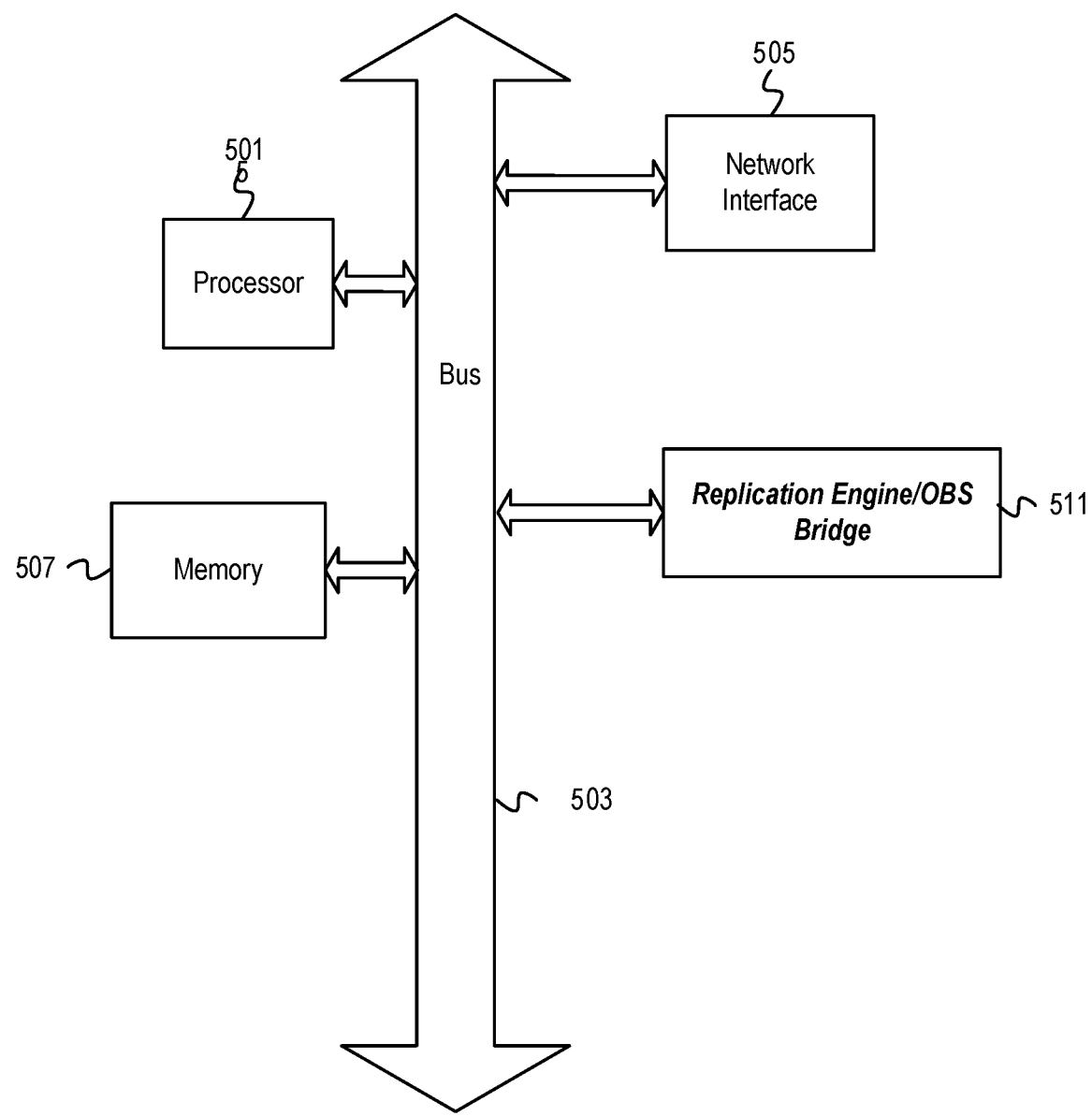
FIG. 5 depicts an example computer system with an object-based replication and recovery appliance in accordance with an embodiment.

FIG. 5 depicts an example computer system with an object-based replication and recovery appliance in accordance with an embodiment. The computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, Hyper-Transport® bus, InfiniBand® bus, NuBus, etc.) and a network interface 505 (e.g., a Fiber Channel interface, an Ethernet interface, an internet small computer system interface, SONET interface, wireless interface, etc.). The system also includes a replication engine 511. The replication engine 511 processes replication and recovery requests, transactions, and data for servicing a source storage system and/or one or more storage clients. Any one of the previously described functionalities may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor unit 501.

While the aspects of the disclosure are described with reference to various implementations and exploitations, it will be understood that these aspects are illustrative and that the scope of the claims is not limited to them. In general, techniques for a replicating file system storage into object-based storage as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality shown as separate components in the example configurations may be implemented as a combined structure or component. Similarly, structures and functionality shown as a single component may be implemented as separate components. These and other variations, modifications, additions, and improvements may fall within the scope of the disclosure.

What is claimed is:

1. A method comprising:
    receiving a stream of file system entities that include,
        inodes, contained within an inode file, data blocks having data block numbers, and pointers from file block numbers (FBNs) of the inode file to the data block numbers, each of the inodes associated with at least a respective one of the FBNs;
    parsing the stream to identify the inodes, the data blocks, and the pointers; and
    replicating the file system entities as objects in an object-based storage (OBS), including
        generating and storing the following in an object-based layout in the OBS:
            at least one inode file object that logically associates the FBNs with file index numbers and logically associates the file index numbers with inode numbers and attribute metadata of the file system entities, wherein the FBNs are arranged in index positions that correspond to index positions of the attribute metadata;
            at least one indirection object that logically associates the inode numbers with respective ones of the data block numbers; and
            at least one data object that contains the data blocks and that logically associates the data block numbers with the data blocks, the at least one data object having: a first object with the data blocks and first indexing and a second object listing the data block numbers with second indexing corresponding to the first indexing.

2. The method of claim 1, wherein said generating at least one inode file object comprises:
    generating an inode file reference object that includes a list of FBNs of the inode file.

3. The method of claim 1, wherein said generating at least one indirection object comprises assigning to the at least one indirection object, an object ID that corresponds to a respective one of the file index numbers and that is used as an object access key.

4. The method of claim 1, wherein said generating at least one data object comprises:
    generating a data reference object that includes a list of the data block numbers.

5. The method of claim 1, further comprising: accessing the at least one inode file object to determine a file index number from the file index numbers based on an inode file FBN corresponding to an inode that represents a file system entity.

6. The method of claim 1, further comprising identifying the data block numbers based on at least one FBN specified by an access request.

7. The method of claim 1, further comprising:
    accessing one or more entries within the at least one data object based on one or more data block numbers.

8. The method of claim 1, further comprising parsing the stream of file system entities to identify data blocks and inode data structures.

9. A computing device comprising:
    a memory containing non-transitory machine readable medium comprising machine executable code having stored thereon instructions for performing a method of managing file system entities in an object-based storage (OBS);
    a processor coupled to the memory, the processor configured to execute the machine executable code to cause the processor to:
    receive a stream of file system entities that include,
        inodes, contained within an inode file, data blocks having data block numbers, and pointers from file block numbers (FBNs) of the inode file to the data block numbers, each of the inodes associated with at least a respective one of the FBNs;
    parse the stream to identify the inodes, the data blocks, and the pointers; and
    replicate the file system entities as objects in an object-based storage (OBS), including
        generating and storing the following in an object-based layout in the OBS:
            at least one inode file object that logically associates the FBNs with file index numbers and logically associates the file index numbers with inode numbers and attribute metadata of the file system entities, wherein the FBNs are arranged in index positions that correspond to index positions of the attribute metadata;
            at least one indirection object that logically associates the inode numbers with respective ones of the data block numbers; and
            at least one data object that contains the data blocks and that logically associates the data block numbers with the data blocks, the at least one data object having: a first object with the data blocks and first indexing and a second object listing the data block numbers with second indexing corresponding to the first indexing.

10. The computing device of claim 9, wherein said generating at least one inode file object comprises:
generating an inode file reference object that includes a list of FBNs of the inode file.

11. The computing device of claim 9, wherein said generating at least one indirection object comprises assigning to the at least one indirection object, an object ID that corresponds to a respective one of the file index numbers and that is used as an object access key.

12. The computing device of claim 9, wherein said generating at least one data object comprises:
generating a data reference object that includes a list of the data block numbers.

13. The computing device of claim 9, wherein the code is further executable by the processor to cause the processor to: access the at least one inode file object to determine a file index number from the file index numbers based on an inode file FBN corresponding to an inode that represents a file system entity.

14. The computing device of claim 9, wherein the code is further executable by the processor to cause the processor to identify the data block numbers based on at least one FBN specified by an access request.

15. The computing device of claim 9 wherein the code is further executable by the processor to cause the processor to:
access one or more entries within the at least one data object based on the one or more data block numbers.

16. A non-transitory machine-readable medium having stored thereon instructions for performing a method comprising machine executable code which when executed by at least one machine, causes the machine to:
receive a stream of file system entities that include,
inodes, contained within an inode file, data blocks having data block numbers, and pointers from file block numbers (FBNs) of the inode file to the data block numbers, each of the inodes associated with at least a respective one of the FBNs;
parse the stream to identify the inodes, the data blocks, and the pointers; and
replicate the file system entities as objects in an object-based storage (OBS), including
generating and storing the following in an object-based layout in the OBS:
at least one inode file object that logically associates the FBNs with file index numbers and logically associates the file index numbers with inode numbers and attribute metadata of the file system entities, wherein the FBNs are arranged in index positions that correspond to index positions of the attribute metadata;
at least one indirection object that logically associates the inode numbers with respective ones of the data block numbers; and
at least one data object that contains the data blocks and that logically associates the data block numbers with the data blocks, the at least one data object having:
a first object with the data blocks and first indexing and a second object listing the data block numbers with second indexing corresponding to the first indexing.

17. The non-transitory machine-readable medium of claim 16, wherein the code to generate the at least one inode file object comprises code to:
generate an inode file reference object that includes a list of FBNs of the inode file.

18. The non-transitory machine-readable medium of claim 16, wherein said code to generate the at least one indirection object comprises code to assign to the at least one indirection object, an object ID that corresponds to a respective one of the file index numbers and that is used as an object access key.

19. The non-transitory machine-readable medium of claim 16, wherein the code to generate the at least one data object comprises code to:
generate a data reference object that includes a list of the data block numbers.

20. The non-transitory machine-readable medium of claim 16, wherein the code further comprises code to: access the at least one inode file object to determine a file index number from the file index numbers based on an inode file FBN corresponding to an inode that represents a file system entity.

* * * * *